(12) United States Patent
Squires et al.

(10) Patent No.: US 10,907,898 B2
(45) Date of Patent: *Feb. 2, 2021

(54) AGGREGATE DEWATERING DEVICE AND METHOD

(71) Applicant: SUPERIOR INDUSTRIES, INC., Morris, MN (US)

(72) Inventors: Frank Squires, Des Moines, IA (US); Jeremy Brown, Columbus, NE (US); Chris Afrank, Columbus, NE (US)

(73) Assignee: Superior Industries, Inc., Morris, MN (US)

( * ) Notice: Subject to any disclaimer, the term of this patent is extended or adjusted under 35 U.S.C. 154(b) by 150 days.

This patent is subject to a terminal disclaimer.

(21) Appl. No.: 16/550,539

(22) Filed: Aug. 26, 2019

(65) Prior Publication Data

US 2019/0376743 A1 Dec. 12, 2019

Related U.S. Application Data

(63) Continuation of application No. 15/189,605, filed on Jun. 22, 2016, now Pat. No. 10,393,435, which is a
(Continued)

(51) Int. Cl.
*F26B 17/26* (2006.01)
*B07B 1/00* (2006.01)
(Continued)

(52) U.S. Cl.
CPC .............. *F26B 17/26* (2013.01); *B01D 33/27* (2013.01); *B07B 1/005* (2013.01); *B65G 33/18* (2013.01);
(Continued)

(58) Field of Classification Search
CPC .. B01D 29/035; B01D 29/56; B01D 29/6476; B01D 33/0346; B01D 33/27;
(Continued)

(56) References Cited

U.S. PATENT DOCUMENTS

| 5,552,044 A | 9/1996 | Abel |
| 7,785,866 B2 | 8/2010 | Winslow |

(Continued)

FOREIGN PATENT DOCUMENTS

| EP | 0072590 A2 | 2/1983 |
| FR | 1454244 | 11/1965 |

OTHER PUBLICATIONS

Superior Industries, Inc., Application No. 16275036.8, "Extended European Search Report" dated Jul. 29, 2016.

*Primary Examiner* — Charles A Fox
*Assistant Examiner* — Kalyanavenkateshware Kumar
(74) *Attorney, Agent, or Firm* — McKee, Voorhees & Sease, PLC (57) ABSTRACT

A dewatering device for aggregate product can be used to retro-fit existing aggregate product dewatering facilities in order to more efficiently capture product. The dewatering device can be movable to allow for the portability of the device relative to existing dewatering facilities. The device is adapted to receive a slurry of aggregate product and water and to vibrate to dry the aggregate product. A recycle system is included to receive any fines that may otherwise be lost by the system. The recycle system captures the fines and redirects them back towards the vibrating process of the vibrating device to direct them towards an exit of the vibrating device in order to use said fines as well as the other dewatered aggregate product. The portability of the device allows the device to be used with the existing facilities without the need to completely replace existing components for dewatering aggregate product.

28 Claims, 6 Drawing Sheets

Related U.S. Application Data continuation of application No. 14/632,747, filed on Feb. 26, 2015, now Pat. No. 9,651,307.

(51) Int. Cl.
| | |
|---|---|
| *B01D 33/27* | (2006.01) |
| *B65G 33/18* | (2006.01) |
| *B65G 53/30* | (2006.01) |
| *F26B 5/00* | (2006.01) |
| *F26B 19/00* | (2006.01) |

(52) U.S. Cl.
CPC ............ *B65G 53/30* (2013.01); *F26B 5/00* (2013.01); *F26B 17/266* (2013.01); *F26B 19/005* (2013.01); *B07B 2230/01* (2013.01); *F26B 2200/08* (2013.01)

(58) Field of Classification Search
CPC . B01D 33/705; B01D 2201/287; F26B 17/26; F26B 17/263; F26B 17/266
See application file for complete search history.

(56) References Cited

U.S. PATENT DOCUMENTS

| | | |
|---|---|---|
| 8,695,804 B2 | 4/2014 | Bennington, II et al. |
| 2009/0057204 A1 | 3/2009 | Bennington, II et al. |
| 2010/0170859 A1 | 7/2010 | Fout |

AGGREGATE DEWATERING DEVICE AND METHOD

CROSS-REFERENCE TO RELATED APPLICATIONS

This is a Continuation application of U.S. Ser. No. 15/189,605, filed on Jun. 22, 2016, which is a Continuation application of U.S. Ser. No. 14/632,747, filed Feb. 26, 2015, now U.S. Pat. No. 9,651,307, issued on May 16, 2017, all of which are herein incorporated by reference in their entirety.

FIELD OF THE INVENTION

The invention relates generally to dewatering aggregate products, such as sand, gravel, ore, or minerals. More particularly, but not exclusively, the invention relates to a retro-fit device, which can be portable or stationary, for use with existing dewatering devices to increase the dewatering of the product while also minimizing power input.

BACKGROUND OF THE INVENTION

In the processing and handling of aggregate materials such as sand, gravel or crushed stone, as well as in related industrial materials like coal, slag, iron ore, phosphate, potash, primary metal and related chemical industries, it is necessary to utilize relatively large quantities of water or other liquids in conjunction with or as a dispersing medium for finely sized solid particles produced in the respective grading, concentration or other process. At some point in the process, it is usually necessary to subsequently effect a separation or dewatering of these fine solid materials from the slurry containing them.

One method of dewatering fine granular material prior to disposing of the waste water or other liquid has been to subject the mixture to suitable dewatering devices. The most widely employed method for dewatering in the mineral aggregates industry is an inclined screw dehydrator, which slowly moves the solid material up the incline of the screw thread out of a feed basin permitting back flow of the water to waste. However, such equipment has limited water handling capacity and is plagued by the loss of valuable fines that are carried away in the back flow.

Another technique involves the use of centrifugal force to remove the free moisture. However, the high cost, high power consumption, and wear characteristics associated with such a centrifuge apparatus have prevented the wide use of that technique on a commercial basis for handling abrasive materials. Similarly, the use of pressure or vacuum filters has not been commercially attractive, particularly for the sand and gravel and crushed stone industries.

Another common technique employed for dewatering fine particle slurries is the use of vibrating dewatering screens. The deck of these screens has often taken the form of finely woven wire cloth through which material may pass. Some have in recent times used urethane decks with small openings for water to pass. However the typical horsepower consumption of a dewatering screen system is high. Moisture content may vary by particle size and mineral composition.

Furthermore, many of these machines used to dewater the aggregate product are expensive and already in place. It is not cost effective to replace entire systems with systems such as those disclosed in U.S. Pat. No. 8,695,804, which is hereby incorporated by reference in its entirety.

As such, there is a need in the art for a drop in or retro-fit unit that can be used with one or more of the existing machines to provide for a dewatering device and recycle device to dry aggregate product and to recycle fine materials that may pass unwanted through a vibrating screen or other drying member.

SUMMARY OF THE INVENTION

It is therefore a primary object, feature, and/or advantage of the invention to overcome or improve deficiencies in the art.

It is another object, feature, and/or advantage of the invention to provide a drop in or retro-fit dewatering device capable of being used with existing dewatering systems to retro-fit said systems for greater efficiency in capturing fine materials.

It is still another object, feature, and/or advantage of the invention to provide a dewatering device that can be moved on skids, wheels, or other members.

It is yet another object, feature, and/or advantage of the invention to provide a dewatering device that can work with an existing screw conveyor to decrease moisture level of aggregate material with minimum power consumption.

It is a further object, feature, and/or advantage of the invention to provide a dewatering device with a recycle system to capture a higher amount of dried aggregate product.

These and/or other objects, features, and advantages of the present invention will be apparent to those skilled in the art. The present invention is not to be limited to or by these objects, features and advantages. No single embodiment need provide each and every object, feature, or advantage.

According to some aspects of the invention, a dewatering device is provided. The dewatering device can be used with existing drying systems, such as screw conveyor or other conveyors, to retro-fit the system to include components to increase the efficiency of the dewatering systems without greatly increasing power consumption.

The dewatering system includes a vibrating screen including a housing comprising side walls. The housing receives aggregate product from the conveyor device. The screen is movable or otherwise vibrating, such as in two directions. A vibrating system, such as motors, flywheels, or some combination thereof, provides the movement to the screen. The screen allows water to pass but not product, which, when dried sufficiently, passes out an outlet of the housing. However, some fine materials may pass with the water through the screen.

A recycle system is positioned at least partially below the screen and includes an underflume for receiving the fine materials and water. The underflume includes an aperture at a lowest point for directing the water and fine materials. The mixture passes through the aperture and into a hose or pipe where water is flowing to direct the mixture through the recycling system and back toward the vibrating screen, such as via the conveyor, where it is re-dried and passed toward the outlet.

The dewatering system can be movable. Thus, wheels, skids, or other movable members can be connected to supports for the system. The movable members allow the dewatering member to be portable and positioned in place adjacent existing drying systems. Furthermore, the portability of the system allows it to be used with multiple drying systems depending upon their location and need of use.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The various figures herein disclosed include aspects of a dewatering device 10 according to aspects of the invention. As will be understood, the dewatering device 10 of the invention provides numerous advantages over the current art. For example, currently, entire systems are used and put in place for dewatering aggregate product, such as sand, ore, gravel, and the like. These systems are expensive, massive, and can take a large amount of time to install. However, as they are beneficial in the dewatering process, they are needed for the dewatering processes. For example, many of the conveyor systems, such as screw conveyors and the like can move large amounts of aggregate product. In many instances, existing dewatering facilities have one or more types of dewatering devices, which have been previously installed and are currently in use. However, some of these existing devices have been in use for many years, and do not include the most up-to-date technology for dewatering. Therefore, the dewatering device 10 of the invention provides for a unique and novel system for retrofitting many of the existing dewatering facilities to increase the efficiency of the dewatering processes at said facilities, while minimizing the cost for the updating and also minimizing the power required to run said facilities once the contents of the invention have been included and retrofit to the existing facilities.

Figure 1:
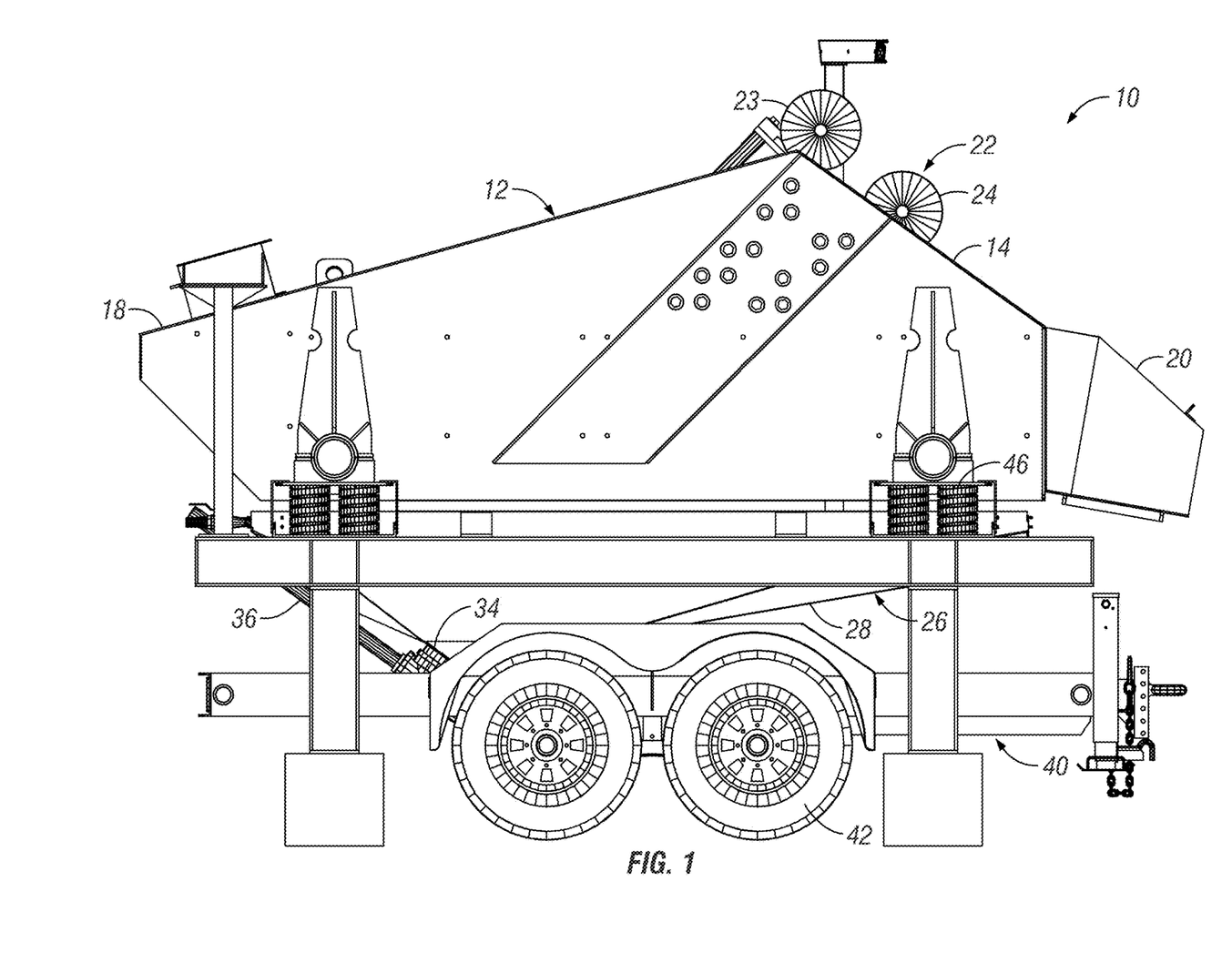
FIG. 1 is a side elevation view of a dewatering device according to aspects of the invention.

FIG. 1 is a side elevation view of a dewatering device 10 according to aspects of the invention. The dewatering device 10 shown in FIG. 1 is a vibrating screen 12 type, which receives an amount of aggregate product and vibrates a screen 16 to remove liquid from said product. An example of such a vibrating screen is shown and described in U.S. Pat. No. 8,695,804, which is hereby incorporated by reference in its entirety. It should be appreciated that the dewatering device in the '804 patent is a fixed-in-place dewatering device, which must be fully installed as an integral unit.

Therefore, the dewatering device 10 as shown in FIG. 1 is a vibrating screen 12. The vibrating screen 12 includes a housing 14, which comprises a plurality of walls defining an interior reservoir for receiving an amount of aggregate product from a conveying device, such as a screw conveyor. The vibrating screen 12 receives the aggregate product at an entrance 18 to which the aggregate product is added to the screen 16 itself. The screen 16 is a vibratory screen in which the screen is movable in at least two directions to vibrate the aggregate product thereon. For example, the screen 16 may be a urethane deck with one-quarter millimeter apertures to allow the screen to dewater a broad range of particle sizes.

The screen may cover a generally planar portion of the reservoir along with extending up at least portions of the walls to increase the amount of area for dewatering the aggregate product. Depending on the application, the openings or apertures in the screen can be up to one millimeter. The deck of the vibrating screen 12 can handle up to 14 inches of material depth, making use of a bottom layer material as filter media. However, the exact dimensions and capabilities of the screen are not to be limited to those precisely disclosed in the invention, and variations to the same are to be included. Those skilled in the art will recognize that different types of screens will be able to handle different types of materials for dewatering thereof.

As mentioned, the screen is a vibratory screen 16 which is movable in more than one direction. The movement of the screen 16 allows for the dewatering of aggregate product applied thereto. A vibrating system 22 may be included and operatively connected to the vibrating screen 16 to provide movement thereof. FIG. 1 shows a vibrating system 22 comprising a first and second motor 23, 24. The motors provide for horizontal and vertical movement of the screen with the product thereon. The motors can be varied to increase vibratory intensity resulting in higher production and drier product if desired. Springs 46, such as compression springs, are placed around the screen housing 14 to allow the movement of the vibrating screen 12 and to provide an opposing force to move the screen back to its original orientation. Therefore, as the motors are causing the movement of the screen, the springs 46 will work with said motors to provide for the continuous movement of the screen 16 to dewater the aggregate product applied thereon.

Furthermore, it should be appreciated that other types of vibrating systems 22 could be utilized to move the screen 16 and/or screen housing 14. For example, a flywheel could be operably connected to the housing 14 in which the rotation of the flywheel is off centered such that it causes movement of the screen 16 in more than one direction to provide for the dewatering of the aggregate product applied thereon. Still other types of vibrating systems 22 are contemplated including a combination of flywheel and motor, flywheel, motor, cams, and/or springs, and the like. Furthermore, any combination of said vibrating systems could be utilized to provide the movement of the aggregate product on the spring.

After the aggregate product has been vibrated on the screen, much of the water will be allowed to pass through the screen apertures to an area below said screen 16. The product is then moved towards an exit 20 of the dewatering device 10, where it can be utilized in a substantially drier form. The exit 20 may include a chute, or other funnel-type member to direct the dried or substantially dried aggregate product towards the exit of the dewatering device 10.

While the screen 16 is chosen such that water will pass while mostly aggregate product will not, it is contemplated that fine materials 64 ("fines") may still pass through the screen 16. This is unwanted, as it is desired to capture as much aggregate product as possible by the dewatering system 10. Therefore, the dewatering device 10 of the invention includes a recycle system 26 to capture any fine materials that may pass through the screen 16 and which would otherwise be lost. The recycle system 26 includes an underflume portion 28, which may also be a trailer or other reservoir type member. As shown in the figures, the underflume trailer 28 is shaped such that any water and/or fine materials passing therethrough will be directed towards a bottommost location of underflume 28 and towards an aperture 30 therethrough. See, e.g., the arrow 64 in FIG. 6.

At the aperture 30 of the recycle system 26, a hose connection 34 allows connection of a nozzle 36 and a water feed 32. The water feed 32 may be any existing water source that is located at the facility or area of use of the dewatering device 10. The water source could also be a portable water source (not shown).

The nozzle 36 is shaped to increase the velocity of the water and fine material slurry as it passes through the nozzle 36. This increased velocity of the slurry will aid in increasing the efficiency of the recycle system 26 to capture as much of the fine materials that are passed therethrough. For example, the fine materials in water that pass through the underflume 28 of the recycle system 26 are passed through the aperture 30 therein and into or towards the nozzle 36. The water coming from the water feed 32 will reach the nozzle and mix with the fine materials passed therethrough to create a slurry. The slurry passes through the nozzle 36 such that the velocity of the fluid is increased as the diameter of the nozzle decreases to aid in moving the slurry mixture in the orientation of the nozzle. The orientation of the nozzle 36 is directed towards a return hose or pipe 38, which will pass the slurry mixture back towards the screen 16 of the dewatering device 10 such that the fine materials of the slurry mixture will be re-vibrated and dried such that they are passed out the exit 20 of the dewatering device 10.

The recycling system 26 of the invention provides numerous advantages in that it allows the capture of any fine materials that may pass through the apertures of the screen 16, and which would previously have been lost or not utilized by the dewatering device. The continuously looped system of the recycle system with the dewatering capabilities of the dewatering device 10 allows for a greater efficiency in capturing the amount of dried aggregate product by the dewatering device 10.

Figure 2:
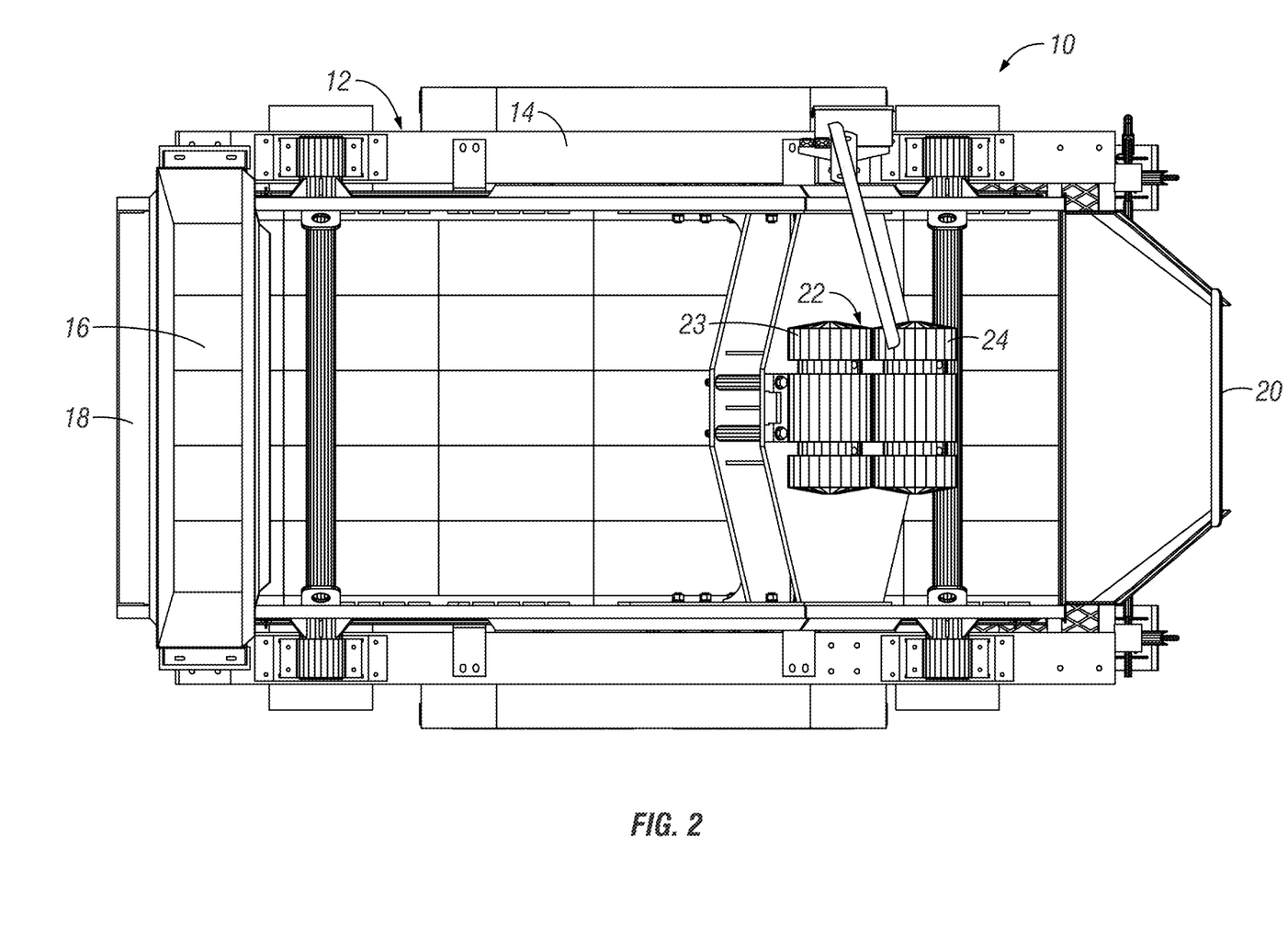
FIG. 2 is a top plan view of the dewatering device.
Figure 3:
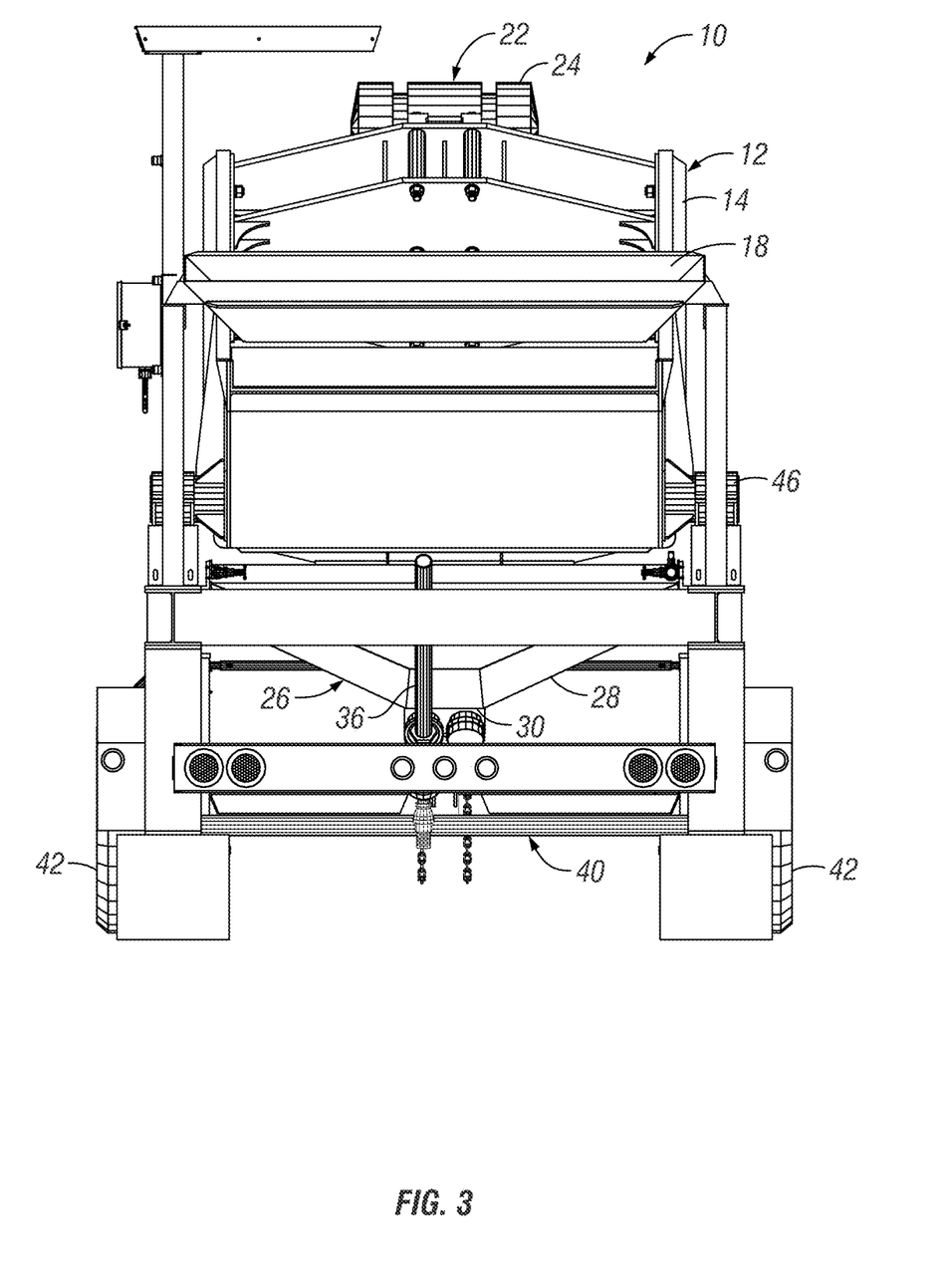
FIG. 3 is a rear elevation view of the dewatering device.

Furthermore, it should be appreciated that the dewatering device 10 is housed on a support 40 when used with a conveyor system of a facility. The support 40, as shown in FIGS. 1-3, may include a plurality of wheels 42 including axles connected to the wheels. The wheels 42 of the dewatering device 10 allow for the movement of the dewatering device relative to a fixed conveying system of an existing dry or dewatering system for aggregate product. Therefore, the wheels 42 allow for the portability of the dewatering device 10 such that it can be used with one or more existing conveying systems of aggregate product, which provides for the advantages of not requiring a complete install of a system, such as that disclosed in the '804 patent, which can include a higher cost.

For example, many aggregate dewatering facilities include the use of a screw conveyor for dewatering the aggregate product. However, these facilities may want to include the use of a dewatering device, such as that with a dewatering or vibrating screen and a recycle system in order to increase the efficiency and amount of aggregate product dried or dewatered and captured using the system. As previously disclosed, using only incline screw dehydrators has limited watering handling capacity and is plagued by the loss of valuable fines that are carried away in the backflow. Therefore, the use of a dewatering system, such as that disclosed in the dewatering device 10 of the invention can be utilized. However, instead of having to replace the entire screw dehydrator, a dewatering device 10, such as that shown in the figures, can be utilized to move said dewatering device 10 relative to the exit of the screw dehydrator wherein the aggregate material moved by the screw will be deposited into the dewatering device 10. This will greatly increase the efficiency of the facility, while maintaining a lower cost of including higher efficiency equipment without a full replacement of existing equipment. Once the dewatering device 10 is positioned adjacent the screw dehydrator, additional supports can be included to maintain the temporary fixed location of the device 10. The device can be used solely with a single conveying means, or else can then be utilized with additional conveyors that are used at the same or different facilities. However, it should be appreciated that, while the device 10 may be portable, it may also be fixed in place or stationary, but still able to be used to retro-fit an existing facility, such as a facility with a conveyor, in order to provide a dewatering system that incorporates the recycling system of the device 10 to increase the efficiency of the system.

While FIGS. 1-3 disclose the use of a dewatering device 10 with wheels 42 for providing portability thereof, it should be appreciated that other systems and other devices can include additional ways for movement of the dewatering device. For example, FIG. 4 discloses a dewatering device 10 which includes skids 44, which make the dewatering device 10 a more stationary device. The rest of the components of the dewatering device 10 are similar to that previously disclosed and described. However, instead of moving the device with the wheels 42, the skids 44 allow for the dewatering device to be stationary or fixed at a location for use with an existing conveying means of aggregate product, such as a screw conveyor.

Still other types of support apparatus are intended to be included, which can allow the device to be portable or stationary, including the combination wheels and skids, skis, tracks, and the like. In addition, the use of a hitch can be included to attach the dewatering device 10 to a vehicle in order to more easily move the device relative to one or more of the existing dewatering systems.

Furthermore, it is to be appreciated that the wheels or other movement apparatuses can be removed from the dewatering device 10 once the device 10 is in a location of use. Therefore, the device can be portable when needed, but can be more fixed in place or stationary when used with a conveying means, such as a screw conveyor of the type for use in moving aggregate product.

Figure 5:
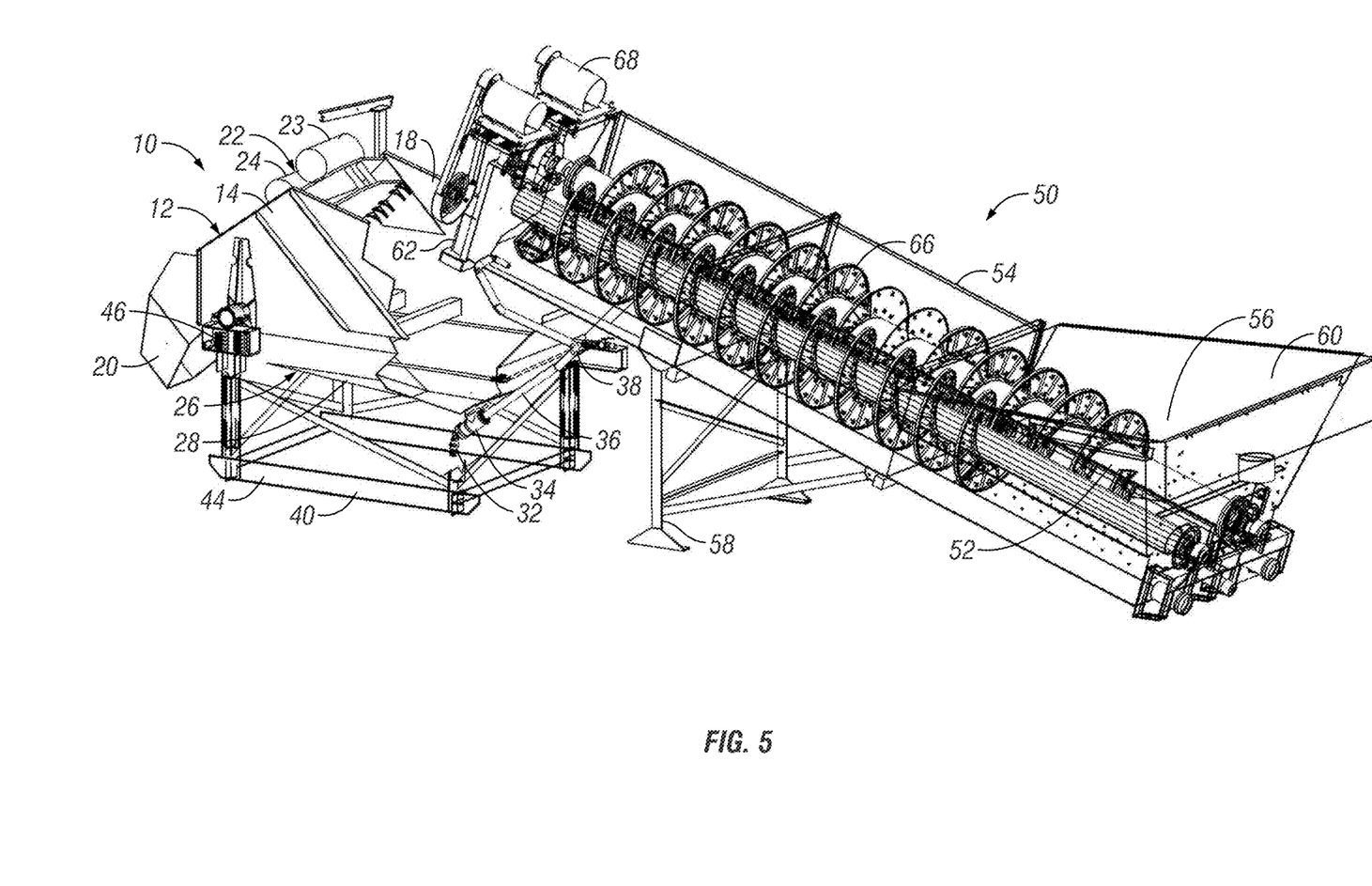
FIG. 5 is a perspective schematic of the dewatering device in use with a screw conveyor.
Figure 6:
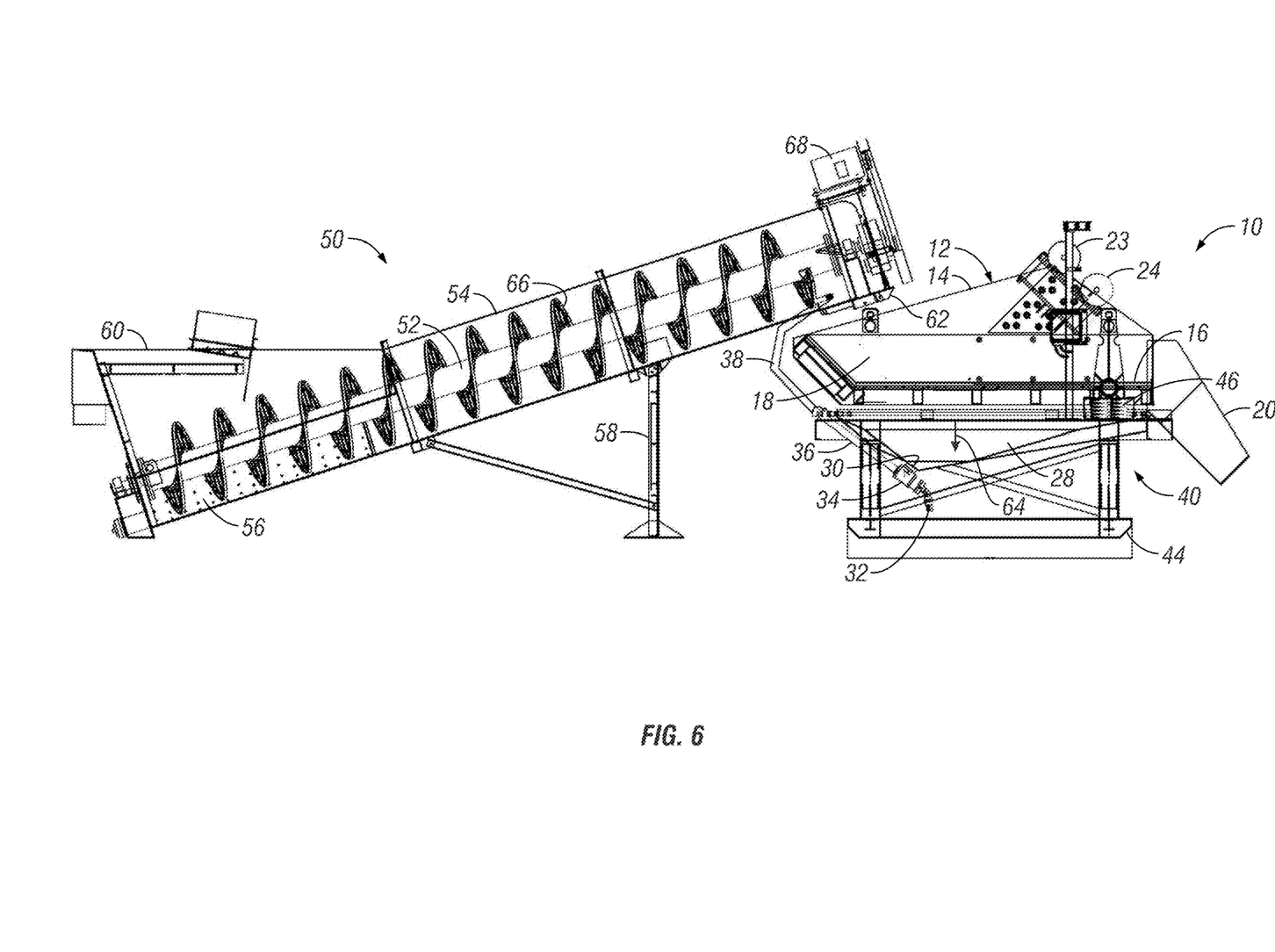
FIG. 6 is a sectional schematic view of the dewatering device in use with the screw conveyor.

FIGS. 5 and 6 disclose the positioning and use of the dewatering device 10 with a conveyor 50 of aggregate product, which is shown to be a screw conveyor 52 of the type known and used. As shown in the figures, the conveyor 50 includes a housing 54 which includes an entrance 60 for receiving aggregate product 56. The aggregate product 56, which includes a water slurry, is added into the entrance 60 at the first end of the screw conveyor 52. The screw 52, which includes a plurality of flights 66, is powered by screw motor 68, which is shown to be at the exit end 62 of the conveyor 50. However, the exact configuration of the conveyor 50 is not to be limited to the invention, and generally any types of conveyors can be used with the dewatering device 10 of the invention.

The aggregate product 56 included in the conveyor housing 54 is moved via the flights 66 of the screw 52 towards the exit 62 thereof. The screw conveyor 50 will remove some of the water from the slurry product. At the exit 62 of the conveyor 50, the remaining slurry is deposited on to the screen 16 of the dewatering device 10 at the entrance 18 thereof. At this location, the motors or vibrating system 22 of the dewatering device 10 will cause movement of the screen 16. The movement of the screen 16 in multiple directions will allow water or other liquids to pass through the screen, while moving the at least partially dewatered aggregate product towards the exit 20 of the dewatering device 10.

However, fine materials 64 may still pass through the screen 16. These fine materials 64 can be captured by the recycling system 26 of the dewatering device 10, such as at the underflume trailer 28 thereof. The shape of the underflume trailer, as shown by the arrow 64 in FIG. 6, will cause the fine materials and any water passing therethrough to be directed towards an aperture 30 in the underflume trailer 28. The slurry mixture will pass through the aperture and will be mixed with water from a water feed 32 at a hose connection 34, where it is directed into a nozzle 36 of the dewatering device 10. The nozzle 36 can increase the velocity of the liquid slurry and pass the liquid slurry into a return hose or pipe 38. The return hose or pipe will direct the slurry mixture including any liquid and fine materials back towards the dewatering device 10, such as passing them back on or in the screw conveyor 50, as is shown in FIG. 6. The location of the return hose or pipe 38 will put the fine material slurry at such a location where it will be deposited back into the vibrating screen 12 of the dewatering device 10. The vibrating of the screen 16 will move the slurry and any additional aggregate product towards the exit 20 for use thereof.

Therefore, the recycle system 26 of the dewatering device 10 can be used with an existing conveyor 50 such that a greater amount of aggregate material, including the fine materials, can be captured by the retro-fit dewatering system. In addition, as the dewatering device 10 is portable, it can be used with existing screw conveyors or other conveyor means such that an entire dewatering system need not be replaced. The portability of the dewatering device 10 of the invention can therefore increase efficiency while keeping installation cost at a minimum.

Those skilled in the art will recognize numerous advantages of the dewatering device 10 of the invention. The use of the dewatering device can achieve moisture content as low as 8% for a saleable product in less than a day. A deeper bed depth allows screens to remove more moisture. Aggressive throw allows for higher feed tonnage and faster drying cycles. In addition, the urethane screen can include sidewalls for additional dewatering along the sides of the bed.

As has been mentioned, the portability of the device will allow for the device to be used with existing facilities without the cost and time of having to replace existing facilities, such as existing screw conveyors that are currently used for the dewatering of aggregate product. The portable system can simply be moved to a location of use and positioned adjacent any existing facilities for use almost instantaneously. In addition, the amount of power consumption will be less than that which is required for other types of dewatering devices. For example, it is contemplated that the horse power required is reduced up to one-third of that currently required by existing dewatering devices.

Figure 4:
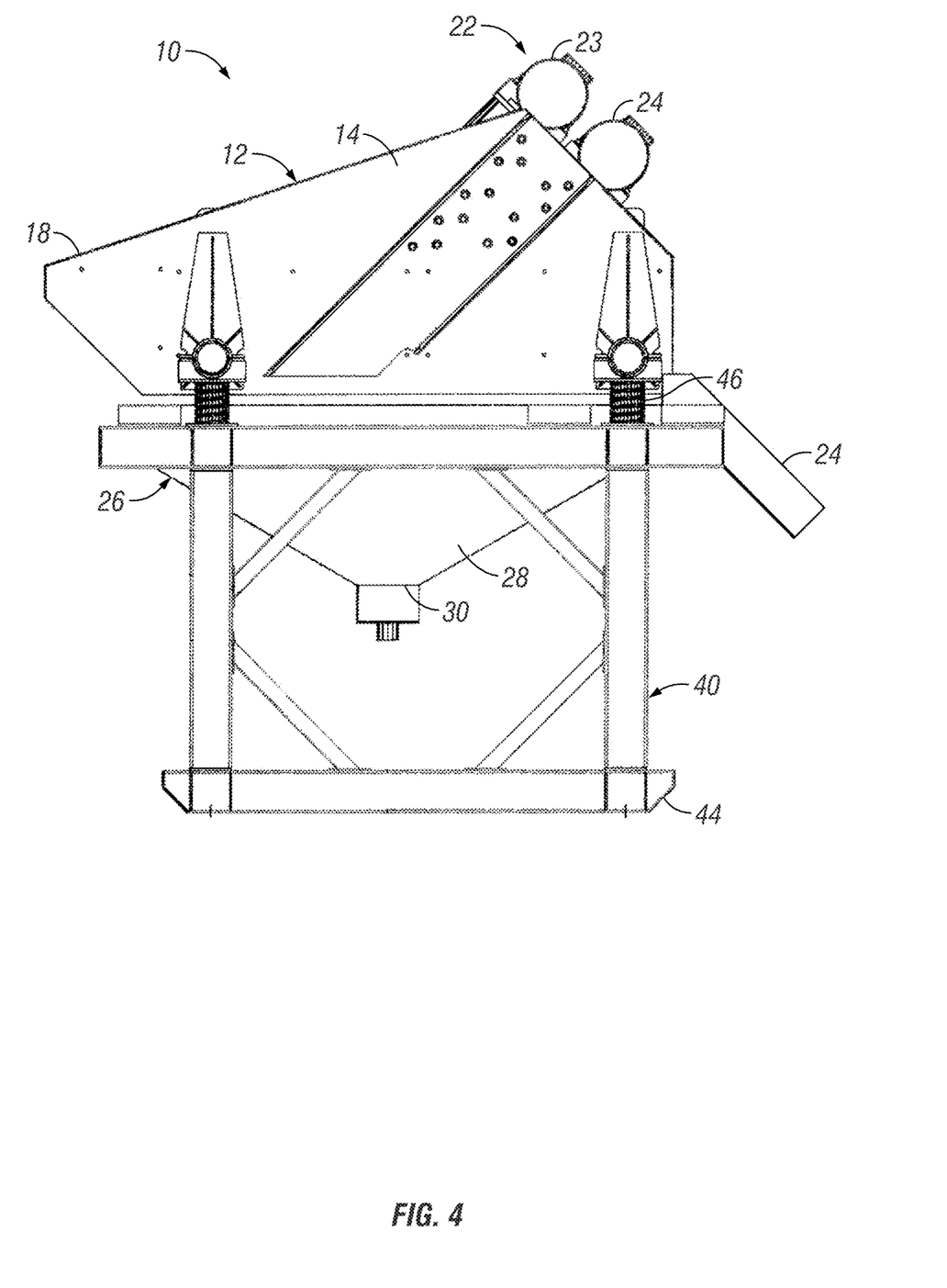
FIG. 4 is a side elevation view of a dewatering device according to additional aspects of the invention.

However, the use of the device, even when not portable, such as the stationary device 10 shown in FIG. 4, will allow for the benefits of the recycle system to be retro-fit or otherwise added to existing facilities. For example, a stationary system can be retro-fit to be independent of but used with an existing facility to include the use of the recycling system of the device 10 to increase the amount of aggregate product obtained from the system.

It should also be appreciated that the dewatering device can be manipulated to be used with a wide range of sizes of conveyor or dewatering means. For example, the height of the dewatering device can be varied according to the support members of the dewatering device 10. For example, it is contemplated that the dewatering device be included with a lift system, such as a hydraulic lift system in order to raise or lower the vibrating screen 12 relative to an existing conveyor means at a location of use. Furthermore, the height may not need to be variable, but the length of nozzle 36 and/or the length of hose or pipe used to connect the nozzle to the conveyor means can also be used to adapt the dewatering device for use with different sizes of existing facilities. Still further adjustments may be made to the dewatering device to allow for the near universal use of the dewatering device with any type of existing dewatering conveyor means or dewatering facility.

For example, while it is contemplated that the dewatering device 10 of the invention be used with conveyor systems such as existing screw dewatering conveyor means, it is also contemplated that the screen could be used with other types of dewatering means in which fine materials or the overall efficiency of the dewatering systems is not ideal. The retrofittability of the invention allows for the manipulation of the device 10 such that it could be adjusted and/or used with many different types of dewatering systems that are currently in use. The device 10 of the invention will allow for the increased efficiency, while maintaining low costs and also increasing efficiency of the dewatering process of aggregate product.

Still other advantages obvious to those skilled in the art will be appreciated and included as part of the invention. The foregoing description has been presented for purposes of illustration and description, and is not intended to be an exhaustive list or to limit the invention to the precise forms disclosed. It is contemplated that other alternative processes, systems, and assemblies obvious to those skilled in the art are to be considered part of the invention. For example, other types of screens, vibrating systems, and movable components are to be included as part of the dewatering device of the invention. It is to be understood that invention includes numerous advantages, as has been shown and described.

What is claimed is:

1. A dewatering device for aggregate product, comprising:
   a vibrating screen for receiving aggregate product from a screw conveyor, the vibrating screen having an entrance disposed to receive aggregate product, said vibrating screen including a vibrating system to move said screen; and
   a recycle system positioned at least partially below the vibrating screen to receive fine materials passed through the screen and to aid in directing the fine materials back to the entrance of the vibrating screen, wherein the recycle system comprises:
   a reservoir member disposed to receive fine materials passed through the screen; and
   a redirection apparatus comprising:
      a first inlet, the first inlet disposed to receive fine materials from the reservoir member;
      a second inlet, separate from the screw conveyor, the second inlet configured to receive a fluid from outside the reservoir member; and
      an outlet at or near the screw conveyor, wherein the fine materials from the first inlet and the fluid from the second inlet are combined in the redirection apparatus and dispensed via the outlet into the screw conveyor.

2. The dewatering device of claim 1, whereby the fluid carries fine materials received from the reservoir member back to the screw conveyor.

3. The dewatering device of claim 2, wherein the screw conveyor comprises a portion of a drying system.

4. The dewatering device of claim 2, wherein the screw conveyor comprises an inclined screw conveyor.

5. The dewatering device of claim 1, wherein said vibrating screen includes an exit for passing dewatered aggregate product.

6. The dewatering device of claim 1, wherein the vibrating system comprises one or more vibrating motors to linearly and horizontally move said vibrating screen.

7. The dewatering device of claim 1, wherein the vibrating system comprises a flywheel operatively connected to the vibrating screen to move said screen.

8. The dewatering device of claim 1, wherein the reservoir member comprises an underflume having an aperture, wherein the recycle system comprises a conduit operatively connected to the underflume, the conduit directing the fine materials in the underflume to the screw conveyor.

9. The dewatering device of claim 8, wherein the conduit is a hose for passing water and fine materials to the vibrating screen.

10. The dewatering device of claim 9, wherein the hose is in communication with the screw conveyor for passing water and fine materials from the recycle system to the screw conveyor, wherein the screw conveyor conveys the fine materials to the vibrating screen.

11. The dewatering device of claim 10, wherein the reservoir member has an outlet, and wherein the fine materials travel by gravity through the outlet and the first inlet into the redirection apparatus.

12. The dewatering device of claim 10, wherein the second inlet is in fluid communication with a water feed.

13. The dewatering device of claim 10, wherein the first inlet is configured to receive a slurry from the reservoir member, the slurry comprising water and the fine materials.

14. The dewatering device of claim 1, wherein the redirection apparatus comprises a nozzle.

15. The dewatering device of claim 14, wherein the redirection apparatus is configured to increase a velocity of the fluid and fine materials passing through the nozzle.

16. The dewatering device of claim 14, wherein a diameter of the nozzle decreases along a direction of fluid travel through the nozzle.

17. The dewatering device of claim 1, wherein the redirection apparatus is in fluid communication with a conduit, wherein fines are directed from the redirection apparatus to the vibrating screen.

18. The dewatering device of claim 1, whereby fine materials are redirected from below the vibrating screen to the entrance of the vibrating screen.

19. The dewatering device of claim 1, wherein the redirection apparatus is in fluid communication with the screw conveyor.

20. The dewatering device of claim 19, wherein the redirection apparatus communicates fluid from a first height lower than the vibrating screen to a second height, the second height being higher than the first height.

21. The dewatering device of claim 20, wherein the screw conveyor conveys the fine materials to a third height, the third height being higher than a height of the entrance of the vibrating screen, whereby the fine material falls by gravity from the screw conveyor onto the vibrating screen.

22. A method of recycling fine materials through a vibrating screen, comprising:
receiving material from a screw conveyor;
receiving a slurry comprising fine materials and water from a lower portion of a vibrating screen;
receiving a fluid from a secondary fluid source via an inlet separate from the screw conveyor;
combining the slurry and the fluid;
at least partially using the fluid, transferring at least a portion of the fine materials to an entrance of the vibrating screen at an outlet at or near the screw conveyor; and
dispensing the fine materials via the outlet at an upper portion of the screw conveyor.

23. The method of claim 22, wherein the step of transferring the fine materials to an entrance of the vibrating screen further comprises:
at least partially using the fluid, transferring the fine materials to a screw conveyor, the screw conveyor being configured to transfer the fine materials to the entrance of the vibrating screen.

24. The method of claim 22, further comprising:
forming a mixture of the fluid and the slurry; and
increasing a velocity of the mixture.

25. A method of recycling fine materials through a vibrating screen, comprising:
depositing materials from a screw conveyor onto a vibrating screen;
receiving a downward-moving slurry comprising fine materials and water from the vibrating screen;
redirecting the fine materials generally upward along a path separate from a screw conveyor;
increasing a velocity of the fine materials via a fluid from a source, wherein the fluid and the fine materials are combined; and
transferring the combination of the fine materials and the fluid towards an entrance of the vibrating screen at an outlet at or near the screw conveyor; and
dispensing the fine materials via the outlet into the screw conveyor.

26. The method of claim 25, further comprising:
receiving a fluid from a secondary fluid source; and
carrying the fine materials using the fluid.

27. The method of claim 26, further comprising:
transferring the fine materials to the screw conveyor, the screw conveyor being configured to transfer the fine materials to the entrance of the vibrating screen.

28. The method of claim 25, further comprising:
transferring the fine materials to the screw conveyor, the screw conveyor being configured to transfer the fine materials to the entrance of the vibrating screen.

* * * * *